United States Patent [19]
Adolfsson

[11] Patent Number: 5,231,851
[45] Date of Patent: Aug. 3, 1993

[54] METHOD AND DEVICE FOR CARBONATING AND COOLING A LIQUID

[76] Inventor: Bengt Adolfsson, Lundagatan 50, S-117 27 Stockholm, Sweden

[21] Appl. No.: 777,516
[22] PCT Filed: May 30, 1990
[86] PCT No.: PCT/SE90/00371
    § 371 Date: Nov. 27, 1991
    § 102(e) Date: Nov. 27, 1991
[87] PCT Pub. No.: WO90/15011
    PCT Pub. Date: Dec. 13, 1990

[30] Foreign Application Priority Data
    May 31, 1989 [SE] Sweden .................. 8901970

[51] Int. Cl.$^5$ ............................... F17C 3/10
[52] U.S. Cl. .................................. 62/48.2; 62/70; 62/71; 222/129.1; 261/151; 261/DIG. 7
[58] Field of Search .......... 62/48.2, 70, 121; 222/129.1; 261/151, DIG. 7

[56] References Cited
U.S. PATENT DOCUMENTS

| | | | |
|---|---|---|---|
| 2,880,594 | 4/1959 | Hesson .................. | 62/48.2 |
| 3,303,660 | 2/1967 | Berg .................... | 62/48.2 |
| 3,672,182 | 6/1972 | Stowasser et al. ........ | 62/121 |
| 4,022,119 | 5/1977 | Karr . | |
| 4,110,996 | 12/1978 | Thompson . | |
| 4,562,013 | 12/1985 | Jeans ................... | 261/DIG. 7 |
| 4,808,346 | 2/1989 | Strenger . | |

FOREIGN PATENT DOCUMENTS 2559651 5/1977 Fed. Rep. of Germany .
2940407 4/1981 Fed. Rep. of Germany .
1051907 12/1966 United Kingdom .

Primary Examiner—Ronald C. Capossela
Attorney, Agent, or Firm—Quarles & Brady

[57] ABSTRACT

In a method for simultaneously carbonating and cooling liquid carbon dioxide under high pressure which is introduced under the liquid surface and is allowed to expand and dissolve in the liquid. Carbon dioxide not dissolved in the liquid is re-introduced under the liquid surface through a compressor and a cooler. A device for carrying out the method includes a closed vessel (1), a liquid inlet (2) opening into the vessel, a carbon dioxide inlet (12) opening into the vessel (1) under the liquid surface, a discharge conduit (5) for carbonated vessel, and, leading from the vessel (1) above the liquid surface, a re-circulation conduit (6,3) for carbon dioxide not dissolved in the liquid, compressor (7) and a cooler (8) being arranged in the re-circulation conduit (6,3).

6 Claims, 1 Drawing Sheet

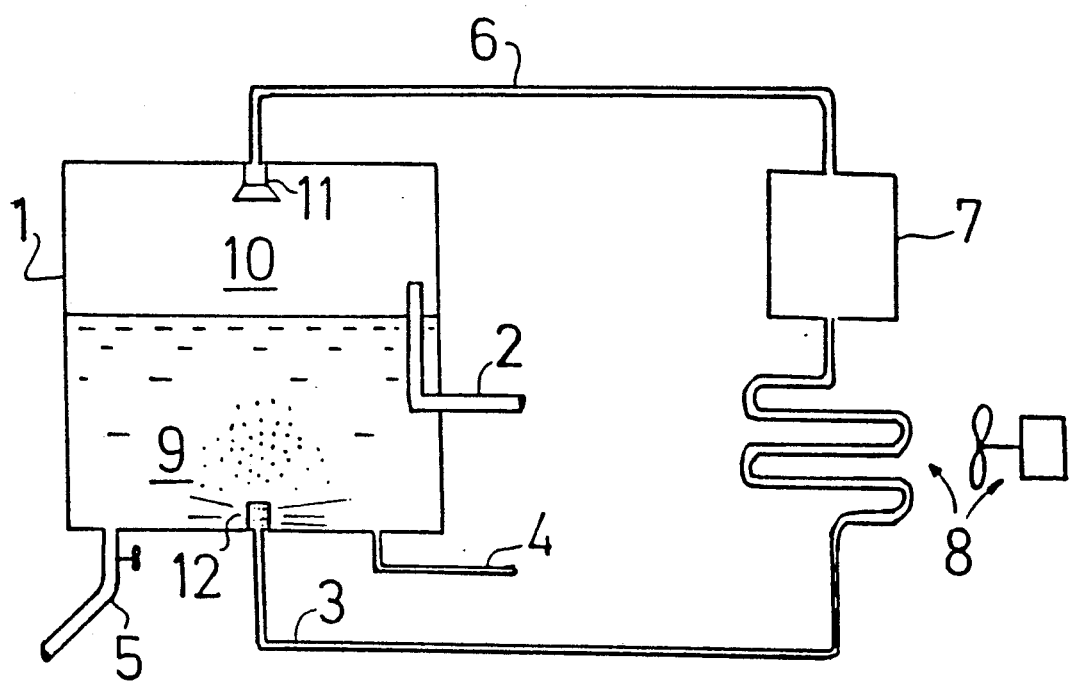

METHOD AND DEVICE FOR CARBONATING AND COOLING A LIQUID

The present invention concerns a method for carbonating and cooling a liquid, particularly a beverage, wherein carbon dioxide under high pressure is introduced under the liquid surface and is allowed to expand and dissolve in the liquid. The invention also concerns a device for carrying out this method, said device including a closed vessel, a liquid inlet opening into the vessel, a carbon dioxide inlet opening into the vessel under the surface of the liquid, a discharge conduit for carbonated liquid, and, leading from the vessel above the liquid surface a re-circulation conduit for carbon dioxide not dissolved in the liquid.

Many different methods and devices for carbonating liquids are known, for instance through DE-25 59 651 and 29 40 407, wherein carbon dioxide under relatively low pressure and through porous diffusers are introduced under the surface of the liquid in order to raise against the liquid surface in the shape of very fine bubbles and under dissolution in the liquid. According to DE-29 40 407 the liquid is further sprayed in an atomized shape into the volume of carbon dioxide undissolved in the liquid which is located above the liquid surface in order thereby to further increase the amount of carbon dioxide dissolved in the liquid. A pump withdraws carbon dioxide from the volume of undissolved carbon dioxide mentioned and re-introduces it under the surface of the liquid. Cooling of the liquid is achieved by cooling circuits arranged in the liquid or outside its vessel.

The known devices for carrying out these methods, thus, require a carbon dioxide circuit as well as a cooling circuit and, therefore, are expensive as well as cumbersome.

U.S. Pat. No. 4,022,119 described a method and a device for simultaneous carbonating and cooling of a liquid using expanding carbon dioxide. The carbon dioxide is kept stored in a tank from which it is introduced at the bottom of an upwardly open carbonating vessel, into which is also successively introduced the liquid to be carbonated. The carbonated liquid flows over the edge of the upwardly open carbonating vessel and down into a surrounding vessel from the bottom of which the carbonated liquid is conducted further to be drawn into containers for consumption. In this known method, which i adapted for industrial, large scale operation, the cooling with expanding carbon dioxide has as its only object to make possible dissolution of larger amounts of carbon dioxide than otherwise would be possible.

The object of the present invention is to provide a new method and a new device for carbonating and cooling of liquids, said device working with only one circuit, which makes the device more simple and cheap. Particularly, the device shall be suitable for preparing cooled carbonated beverages in households, in offices and the like where a fast and effectively working device requiring little space is demanded.

In order to achieve these objects the invention has been given the characteristics appearing in the following claims.

BRIEF DESCRIPTION OF THE DRAWING

The FIGURE schematically shows a device for carbonating and cooling a liquid according to the invention.

In a vertical wall of a closed container 1 opens a feeding conduit 2 for liquid, such as water, and in the bottom of the container open a high pressure conduit 3 for introducing carbon dioxide in the liquid and a refill conduit 4 for carbon dioxide. Also extending from the bottom of the container is a discharge conduit 5 for carbonated liquid. From the upper wall of the container extends a re-circulation conduit 6 for carbon dioxide.

The re-circulation conduit 6 is connected to a compressor 7 the output side of which is connected to the high pressure conduit 3 through a cooler 8.

When filling liquid through conduit 2 a volume 9 of liquid is obtained in the container 1, and, by injection of carbon dioxide through the filling conduit 4 a volume 10 of carbon dioxide undissolved in the liquid is obtained located above the liquid surface.

In a known manner the undissolved carbon dioxide located in the volume 10, possibly through a humidity regulator 11, is re-circulated through the re-circulation conduit 6 to the container 1. According to the present invention, however, this takes place through the compressor 7 which shall be capable to achieve a substantial rise of the pressure in the carbon dioxide from a pressure of about 0.7-1 MPa preferably to a pressure of about 6.5 MPa or more, such that the carbon dioxide is transferred to liquid phase. At compression the temperature of the carbon dioxide is considerably raised (up to about 250° C.). Therefore, it is suitable to divide the compression in two steps by means of a two step compressor with intervening cooling. In any case, the carbon dioxide, which is hot after compression, is cooled in the cooler 8, whereafter the carbon dioxide, preferably in liquid state, is introduced through the conduit 3 and a restriction nozzle 12 into the volume 9 of liquid and is there allowed to expand and transform into steam phase.

According to the present invention, the lowering of temperature resulting from the expansion in the restriction nozzle 12 is used for cooling the liquid simultaneously as the gaseous carbon dioxide on its way up towards the liquid surface partly dissolves in the liquid and carbonates it.

In the device is also included means not shown to achieve filling of liquid through the conduit 2 preferably opening above the liquid surface, as well as means not shown to fill carbon dioxide into the system through the conduit 4 at need.

A device according to the present invention used for carbonating and cooling beverages, i.e., as a lemonade machine, provides substantial advantages compared to such devices having separate carbonating and cooling circuits. Tests have been performed applicating the method stated and utilizing a test device using liquid carbon dioxide from a bottle. The carbon dioxide had a temperature of about +20° C. and was injected into a water volume of 3 liters which also had a temperature of about +20° C. At a carbon dioxide flow of about 100 g/min a lowering of temperature in the water volume of 6.3° C./1min was obtained which corresponds to a cooling effect of −0.53° C. per 20 cl and second. This, in turn means that the system theoretically manages to cool a normal drinking glass (20 cl) of a +15° C. beverage to +5° C. in less than 20 seconds. Since usual tap water normally has a temperature of about +10° C. one can calculate to obtain a cooling of 20 cl such water to +5° C. in less than 10 seconds. Simultaneously, carbonating takes place within a few seconds.

I claim:

1. A method for simultaneously carbonating and cooling a liquid contained in a closed container and defining therein a liquid surface, comprising the steps of:

introducing carbon dioxide under high pressure into said container under said liquid surface and allowing at least a portion of said carbon dioxide to expand and dissolve in said liquid;

collecting a remaining portion of carbon dioxide not dissolved in said liquid above said liquid surface within said container and;

recirculating said remaining portion by conducting it to a compressor;

compressing said remaining portion in said compressor;

directing said remaining portion in a compressed state from said compressor to a cooler;

cooling said remaining portion in said cooler; and re-introducing said remaining portion in a compressed and cooled state into said container under said liquid surface.

2. A method according to claim 1, wherein said remaining portion is compressed and cooled into liquid state in said compressor and cooler.

3. The method according to claim 1, wherein the liquid is a liquid beverage.

4. A device for simultaneously carbonating and cooling a liquid, comprising:

a closed container (1) for containing said liquid under pressure up to a predetermined liquid level;

a liquid inlet (2) opening into said container a carbon dioxide inlet (12) opening into said container (1) under said predetermined liquid level;

a discharge conduit (5) for liquid carbonated by said carbon dioxide; and a re-circulation conduit (3, 6) for carbon dioxide not dissolved in said liquid, said re-circulation conduit being connected to said container above said liquid level, said re-circulation conduit including a compressor (7) and a cooler (8), said cooler (8) being arranged after said compressor in a re-circulation flow direction of the carbon dioxide and connected to said carbon dioxide inlet (12).

5. A device according to claim 4, wherein a refill conduit for carbon dioxide opens into said container under said liquid surface.

6. The device according to claim 4, wherein the liquid is a liquid beverage.

* * * * *